United States Patent
Mullowney

(10) Patent No.: US 8,336,129 B2
(45) Date of Patent: Dec. 25, 2012

(54) SYSTEM AND METHOD FOR DISPOSAL OF MUTAGEN WASTE

(76) Inventor: James T. Mullowney, Newport, RI (US)

( * ) Notice: Subject to any disclaimer, the term of this patent is extended or adjusted under 35 U.S.C. 154(b) by 651 days.

(21) Appl. No.: 12/431,355

(22) Filed: Apr. 28, 2009

(65) Prior Publication Data

US 2009/0265845 A1 Oct. 29, 2009

Related U.S. Application Data

(60) Provisional application No. 61/048,382, filed on Apr. 28, 2008, provisional application No. 61/199,720, filed on Nov. 19, 2008.

(51) Int. Cl.
*A47K 11/10* (2006.01)
*E03D 9/10* (2006.01)

(52) U.S. Cl. ............... 4/479; 4/484; 4/320; 210/749

(58) Field of Classification Search ...... 4/319, 320–321, 4/440–442, 479, 484; 210/713, 764, 710, 210/749; 167.17; 588/252; 119/165–167
See application file for complete search history.

(56) References Cited

U.S. PATENT DOCUMENTS

| | | | | |
|---|---|---|---|---|
| 1,949,246 A * | 2/1934 | Duner | ............... | 4/420 |
| 3,023,425 A * | 3/1962 | Illo | ................... | 4/469 |
| 3,688,742 A * | 9/1972 | McGee | ............... | 119/162 |
| 4,152,788 A * | 5/1979 | Gomes | ............... | 4/445 |
| 4,437,430 A * | 3/1984 | DeBardeleben | ........... | 119/162 |
| 4,615,810 A * | 10/1986 | Conner | ........... | 405/129.3 |
| 5,391,351 A * | 2/1995 | Kaufman | ........... | 422/28 |
| 6,240,576 B1 * | 6/2001 | Cosby | ............... | 4/483 |
| 6,317,900 B1 | 11/2001 | Braxton | ............... | 4/483 |
| 6,802,085 B2 * | 10/2004 | Catanescu et al. | ........... | 4/471 |
| 7,150,050 B2 * | 12/2006 | Sharp | ................ | 4/484 |
| 7,311,207 B2 | 12/2007 | Mallett et al. | ............... | 209/702 |
| 2003/0115665 A1 | 6/2003 | Braxton | ............... | 4/483 |
| 2004/0144682 A1 | 7/2004 | Altmayer | ........... | 206/524.7 |
| 2005/0114993 A1 * | 6/2005 | Schaaf | ............... | 4/449 |
| 2008/0083061 A1 * | 4/2008 | Dubiel | ............... | 4/484 |
| 2008/0256696 A1 * | 10/2008 | Walsmley | ........... | 4/420 |
| 2008/0263756 A1 * | 10/2008 | Marsden | ........... | 4/239 |

\* cited by examiner

*Primary Examiner* — Winnie Yip

(74) *Attorney, Agent, or Firm* — Sunstein Kann Murphy & Timbers LLP

(57) ABSTRACT

An assembly and method for processing human waste includes providing a supporting base having an opening within which a waste reservoir is affixed. The assembly may be installed on or below a rim of a toilet bowl. Solidification and pathogen killing materials are provided. The materials are deposited in the reservoir either prior to or upon accumulation of waste in the reservoir. The reservoir with the solidified waste is then sealed and transported to a collection facility.

7 Claims, 9 Drawing Sheets

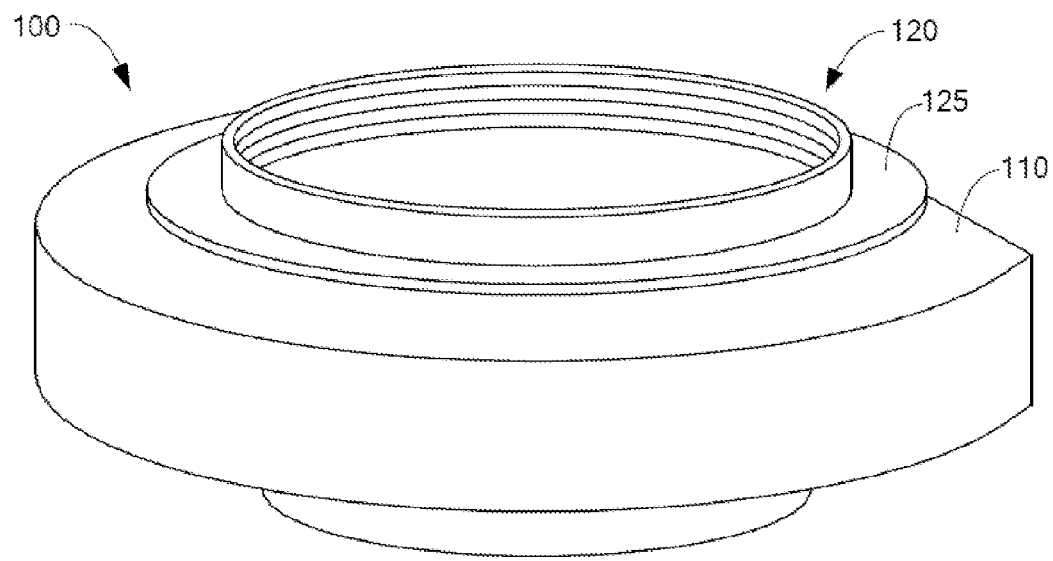
FIG. 1
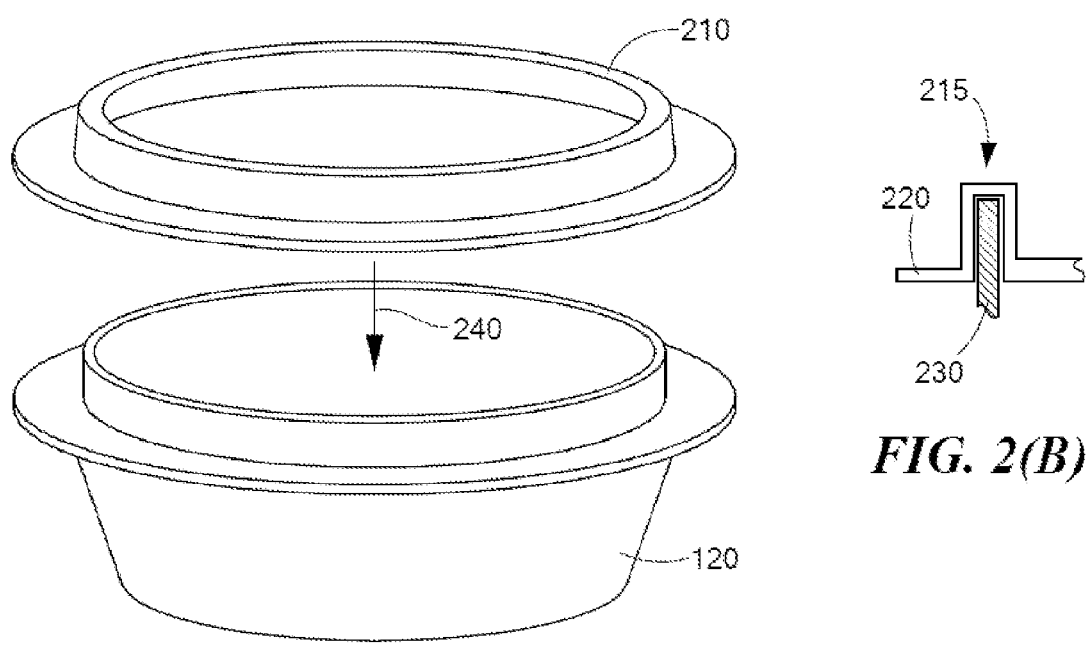
FIG. 2(A)
FIG. 2(B)

SYSTEM AND METHOD FOR DISPOSAL OF MUTAGEN WASTE

CROSS-REFERENCE TO RELATED APPLICATIONS

This application claims priority from U.S. Provisional Patent Application Nos. 61/048,382 filed on Apr. 28, 2008 and 61/199,720 filed on Nov. 19, 2008, each of which is incorporated herein in its entirety.

TECHNICAL FIELD

The present invention relates to a system and method for disposal of mutagen waste, and more particularly to disposal of human waste contaminated with pharmaceuticals.

BACKGROUND ART

Human waste from a person undergoing chemotherapy typically includes toxic chemicals that are carcinogenic. According to the estimates, about 98 percent of the administered chemotherapy drugs pass through the human body. When disposed of conventionally through the septic system and/or sewage treatment plant, even trace amounts of carcinogens can affect the environment. Burning the carcinogenic human waste is also inadequate as burning contaminates air.

More advanced methodologies for disposing of such waste include transporting the waste to a facility at which the toxic chemicals are removed from the waste and recycled or disposed of in a safe manner. However, this conventional approach is complex and not cost efficient.

SUMMARY OF THE INVENTION

Embodiments of the invention provide an assembly and method for processing human waste that generally contains pathogens or carcinogens.

In an embodiment of the invention, a method for collecting the mutagen waste is provided, the method including placing a support in relation to a rim of a toilet and affixing a rigid waste container to an opening of the base to form a waste-collecting assembly. The support may be placed on or below the rim of a toilet, and may include a side surface congruent with and corresponding to an inner surface of a bowl of a toilet. In addition or alternatively, the reservoir may include a flange protruding outwardly from a body of the reservoir above the support.

The method may further comprise accumulating human waste in the rigid reservoir and depositing a solidification material in said reservoir to solidify the waste. The waste may include at least one of a pharmaceutical agent, a mutagen, a carcinogenic, a toxin, a chemotherapy chemical, and other hazardous materials. In addition or alternatively, the method may include depositing a pathogen killing material in the reservoir, where the pathogen killing material may be at least one of an acidic material, an alkaline material, a neutral material, lime, sodium hydroxide, calcium hydroxide, calcium carbonate, sodium sulfate, and sodium carbonate. Furthermore, the accumulated waste may be sealed within the container, e.g., with a lid and additional adhesives, and transported to a collecting facility.

In accordance with another embodiment of the invention, a method of processing human waste is presented. The method includes a step of providing a portable toilet for accumulation of human waste. The portable toilet may be used by a patient who has been treated with a pharmaceutical agent. The method further includes a step of accumulating human waste in said toilet; depositing solidification material in said toilet prior to or after the waste is accumulated in said toilet; and transporting said toilet with solidified waste to a collection facility, which in a specific embodiment may be a landfill. The method may further include providing a pathogen killing material and depositing the pathogen killing material in the toilet.

According to a related embodiment, a waste-collecting assembly for disposing human waste is disclosed for use in conjunction with a toilet. The waste-collecting assembly includes a base having an aperture therethrough and dimensioned to be disposed in relation to a rim of the toilet. In various embodiments, the base may have a side peripheral surface congruent to an inner surface of a bowl of the toilet and be disposed below or on the rim of a toilet. The side peripheral surface may be circumferential, and the aperture may be located in a substantially central portion of the base.

The assembly may further include a waste reservoir for receiving and accumulating human waste, the reservoir coupled to the base, having an input opening, and dimensioned to be disposed within the aperture through the base. At least one of the base and the reservoir may be rigid.

The base may include a curvilinear surface defining a downward slope from a peripheral portion of the base towards the aperture. In addition or alternatively, the base may include a planar surface between a peripheral portion of the base and the aperture. In a specific embodiment, the base and the reservoir may form an integral and inseparable unit, e.g., co-molded together or, alternatively, molded as a single piece. The aperture through the base and the reservoir may include mating surfaces.

In addition, the assembly may include a sealing mechanism (or seal) sealing the waste accumulated within the container to prevent the waste from leaking out. In a related embodiment, the seal may be formed between the reservoir and a lid coupled to the reservoir. In a particular embodiment, the seal may be formed by mating threads.

In a related embodiment, the reservoir may include a generally tapered surface that facilitates guiding the waste being collected to the opening of the reservoir. Such a circumferential surface may be elevated with respect to the edge of the opening of the reservoir. In a specific embodiment, the container may include a flange protruding outwardly from a body of the reservoir above the base. The flange may be circumferential and have an outer rim that is elevated with respect to the input opening of the reservoir.

The assembly may further include means for solidifying the human waste accumulated in the reservoir and means for killing pathogens in the accumulated human waste.

Another related embodiment provides a disposable waste containment apparatus comprising an inseparable unit that includes a container, the container having a flange extending outwardly from a neck of the bowl container, wherein the flange is adapted for supporting the apparatus on a rim of a toilet bowl and under a toilet seat.

BRIEF DESCRIPTION OF THE DRAWINGS

The foregoing features of the invention will be more readily understood by reference to the following detailed description, taken with reference to the accompanying drawings, in which:

FIG. 1 shows an assembly for collecting human waste, in accordance with an embodiment of the invention;

FIGS. 2(A, B) illustrates a container (reservoir) and a cover lid for the reservoir, used in collecting human waste, in accordance with an embodiment of the invention. More particularly, FIG. 2(A) shows a perspective view. FIG. 2(B) shows in more detail a retention seal between the container and the cover lid, in accordance with an embodiment of the invention;

FIG. 4(A) shows an embodiment including a straight supporting base having a flat upper surface and a side peripheral surface disposed at a right angle to the upper surface. FIG. 4(B) shows an embodiment including a supporting based having an upper surface sloped towards the opening in the base and a curved side peripheral surface.

FIGS. 6(A-D) illustrate an embodiment of a waste collecting assembly molded as an inseparable unit.

FIGS. 8(A-C) shows an embodiment of the invention adapted to operate as a leased unit and including a removable waste-collecting chamber sealable upon use. More particularly.

DETAILED DESCRIPTION OF SPECIFIC EMBODIMENTS

Figure 3:
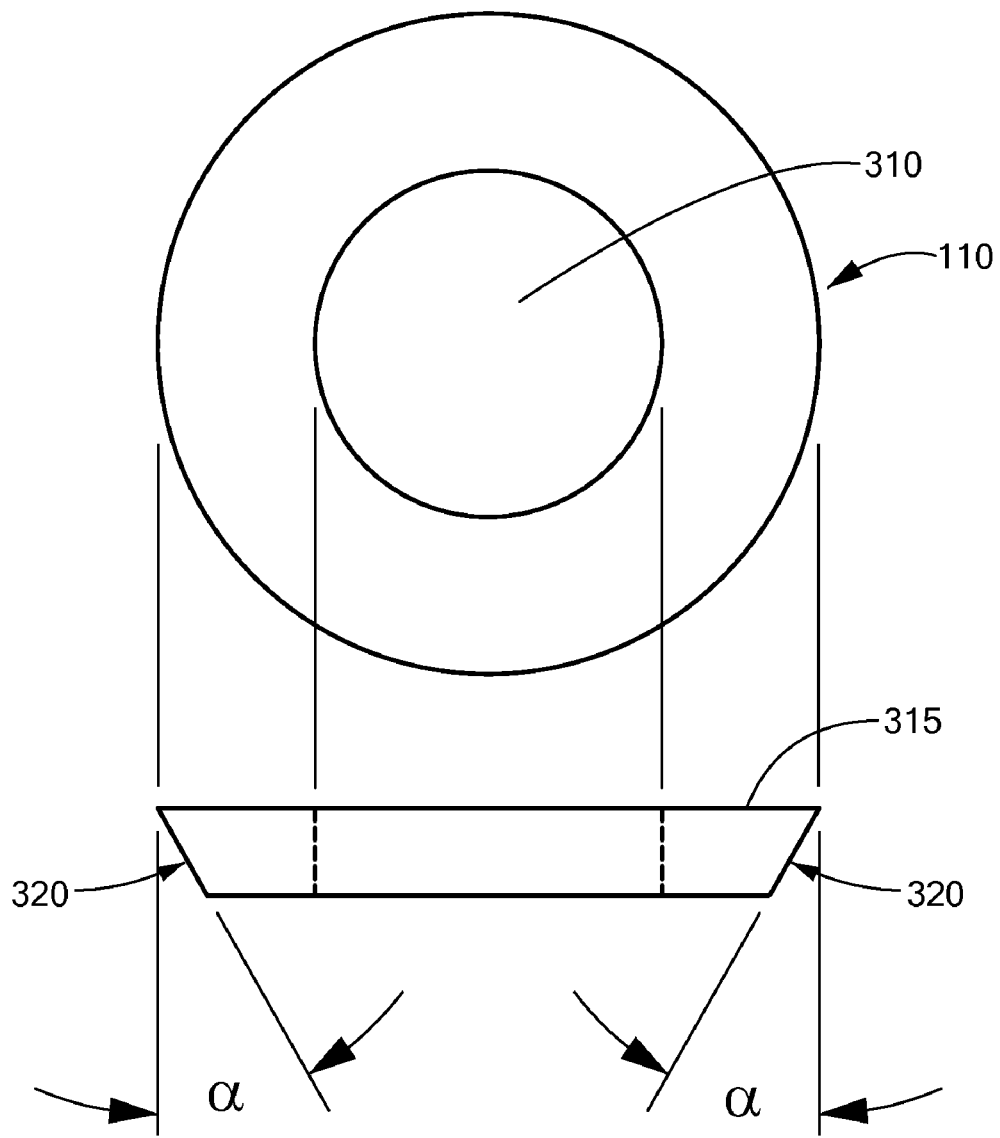
FIG. 3 shows an exemplary embodiment of a base used in one embodiment of the assembly, in accordance with an embodiment of the invention.

Illustrative embodiments of the invention present a method and a system for safely collecting and disposing human waste from a patient treated with a dangerous pharmaceutical. The treatment of the waste may prevent damage to the environment and other people. The details are discussed below.

FIG. 1 shows a waste-collecting assembly 100, for use in conjunction with a toilet, for collecting and processing pathogenic excreta, in accordance with an embodiment of the invention. The assembly 100 may include a supporting base (also referred to hereinafter as plate) 110, a container 120, which is a waste reservoir supported by the base 110, and a container lid (not shown) that enables a sealed closure for the toxic contents of the container 120 prior to processing. In various embodiments, the base 110 and the container 120 may be fabricated as one element or, alternatively, inseparably integrated with one another.

The container 120 may be substantially rigid. In other embodiments, the container 120 may be flexible, such as, e.g., a bag made of plastic. For the purposes of this disclosure, the rigidity of the container 120 is defined as the container's ability to maintain its shape as a freestanding unit, i.e. without a support, whether the container 120 is empty or has some contents in it. A rigid container 120 is contrasted with a plastic packet or bag, the shape and form of which is generally defined by its contents. In other embodiments, the supporting base 110 is also rigid and resistant to changing its shape under the load of the waster reservoir 120 filled with the waste. The use of various flexible trash-collecting containers may increase the overall cost-efficiency of the trash-collecting process. Such flexible containers are well known in the art and, therefore, may present an obvious choice for collecting the human carcinogenic waste. On the other hand, a rigid container used in the present invention may lend itself to easily shaking the contents of the contained to facilitate the mixing of the solidifying agents and the collected waste, as described below. In addition or alternatively to the solidifying components, agents may be added to the waste that chemically neutralize, de-activate, or detoxify the carcinogens contained in the waste. Moreover, a rigid embodiment of the container 120 is inherently more safe and leak-proof in comparison with the flexible container, which may rip.

In operation, the supporting base 110 may be placed in relation to a rim of the toilet. For example, the base 110 may be installed below the rim of a bowl of the toilet, and further fitted with the container. Alternatively, the container 120 may be attached to the supporting base 110 prior to placement in the toilet. Thereafter, the toilet is used by the patient. After the waste has been accumulated within the container, the lid is applied to seal the contents within the container for further processing.

An example of the container 120 and a lid 210 is shown in FIGS. 2(A, B), in accordance with an embodiment of the invention. FIG. 2(A) shows a perspective view. In FIG. 2(B), an embodiment of a retention seal 215 is shown that is formed by snap-fitting a peripheral structure 220 of the lid 210 onto a peripheral element 230 of the upper wall of the container 120, as shown by an arrow 240. Generally, however, any retention seal known in the art may be used. In some embodiments, for example, a seal between the lid and the container may be formed by thread fitting of the lid onto the container. An embodiment of a seal may also have a built-in sealing redundancy provided by multiple sub-seal arrangements, such as micro-bead surfaces or multiple contact arrangements as known in the art. In an embodiment utilizing a flexible container 120 such as a plastic bag, a lid 210 may not be required. In such a case, the sealing of waste and reactive agent mix contents of the flexible container may be provided using other methods known in the arts, for example by zip-locking or by providing a foldable base 110, which, upon collapsing, closes upon itself and seals the flexible container 120.

In various embodiments, the supporting base 110 may include a plate having an opening for fitting the container 120 as shown in FIG. 1. The plate may have a thickness sufficient to support a load defined by the anticipated contents of the container, for example several pounds. A schematic sketch of one embodiment of the supporting plate 110 with a through opening 310 is shown in FIG. 3 in side and top views. The supporting plate 110 may be made, without limitations, from various suitable materials such as plastics or metals. In an embodiment, the side peripheral surface 320 of the supporting base 110 may be slightly curved or sloped with respect to an upper planar surface 315 (as indicated in FIG. 3 by the angle α that may range from a fraction of a degree to tens of degrees). Such a curved or sloped surface 320 may be made congruent with the sloped inner surface of a toilet bowl within which such supporting base is disposed. That the sloped surface is congruent and complementary with the toilet bowl, allows for a close and stable mating interface between the two. In other embodiments, the side peripheral surface of the base can form a right angle with the top and/or bottom surfaces of the base. In related embodiments, an upper surface and/or a lower surface of the supporting base may be generally non-planar.

In further reference to FIGS. 1 and 3, a supporting flange 125, which extends outwardly with respect to the outer surface of the container 120, may have dimensions that are larger than the dimensions of the opening 310 in the supporting base 110. The perimeter of the body of the container 120 and its outer shape, on the other hand, may be appropriately sized to provide for a firm fit within the opening 310. In such a case, the container 120, when inserted into the base opening 310, may be stably kept in its inserted position within the supporting base 110 simply due to a tight fit of the body of the container within the opening 310 and the resting of the flange 125 on the upper surface 315 of the supporting base 110. In this embodiment, both the opening 310 and the container 120 may have any suitable peripheral shape. A generally tapered shape, e.g. slightly conical shape, may be preferred to provide for a tight fit as discussed above.

Figure 4:
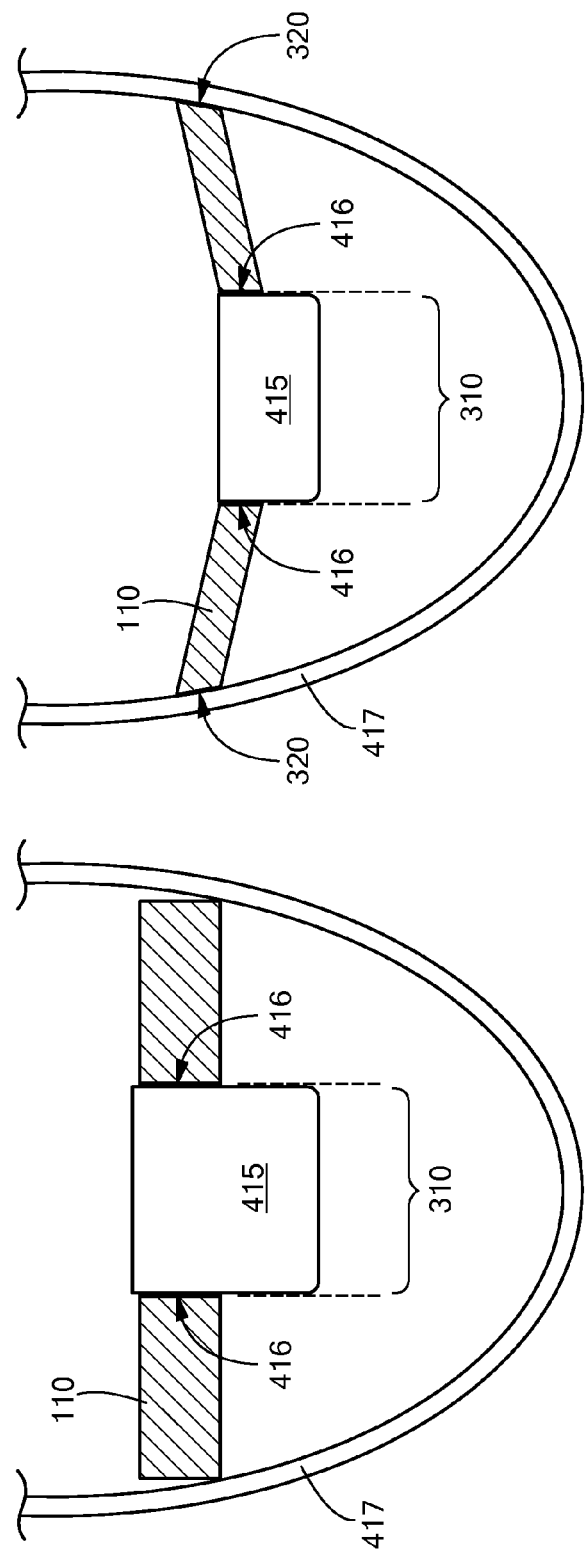
FIGS. 4(A, B) illustrate side views of embodiments of the assembly installed within a toilet bowl.

In another embodiment, shown in FIG. 4(a), the circular opening of the straight supporting base 110 may be provided with an inner thread that is complementary to a thread on the outer surface of the neck of the container 120. In such embodiment, the container may be thread-fitted, 416, to the throughout opening in the supporting base 110, e.g. from below the base 110 prior to installing the base into the toilet bowl 417 in relation to the rim of the toilet (not shown). As illustrated in FIG. 4(a), the base 110 is installed below the rim of the toilet. In a related embodiment, shown in FIG. 4(b), a generally non-planar supporting base 410 curved or sloped side peripheral surface 320 and a non-planar upper surface 420 may be utilized. As shown, the upper surface 420 is downwardly sloped towards the opening 310 in the base 410. The use of such a base 410 may facilitate the collection of waste in the container by guiding the spilled waste (or waste otherwise disposed on the surface 420 outside the opening 310) towards the opening 310 along the curved surface 420. In this embodiment, the lid (or cover) may be fitted as known in the art onto the upper portion of the container. In a specific embodiment, the base 410 may be shaped to have a generally conical surface 420.

Figure 5:
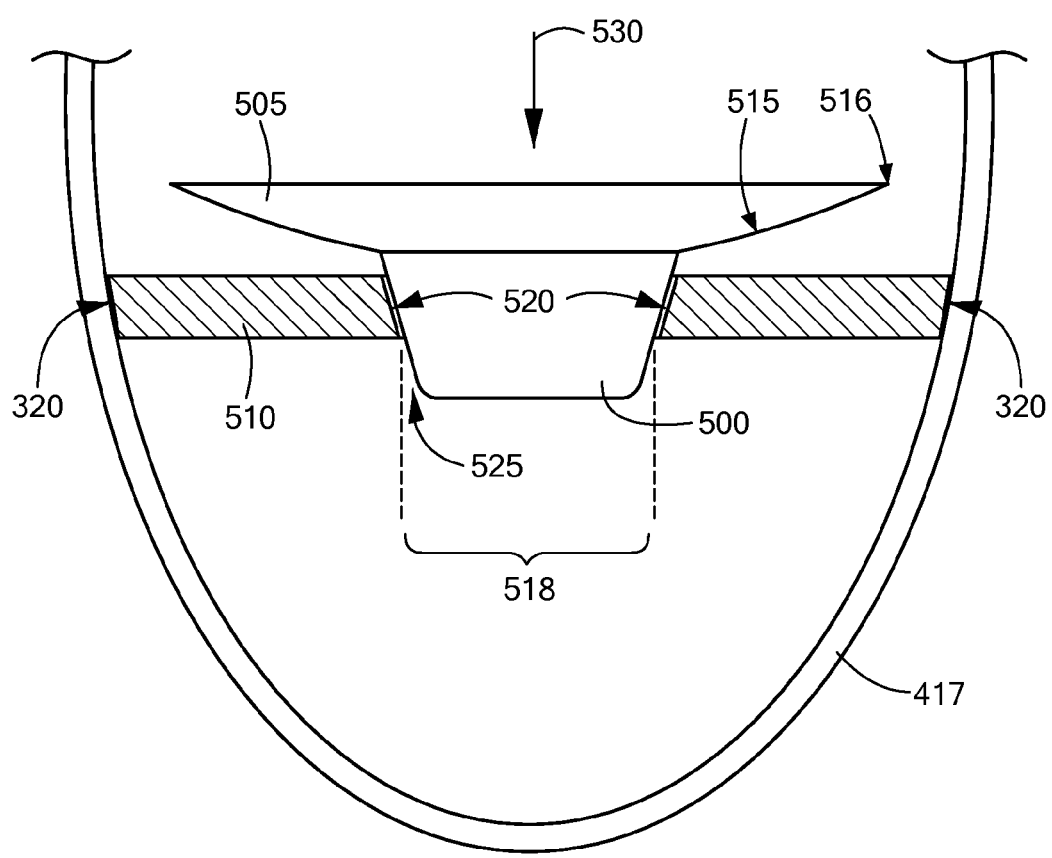
FIG. 5 illustrates a side view of another implementation of the assembly, in accordance with an embodiment of the invention.
Figure 6A:
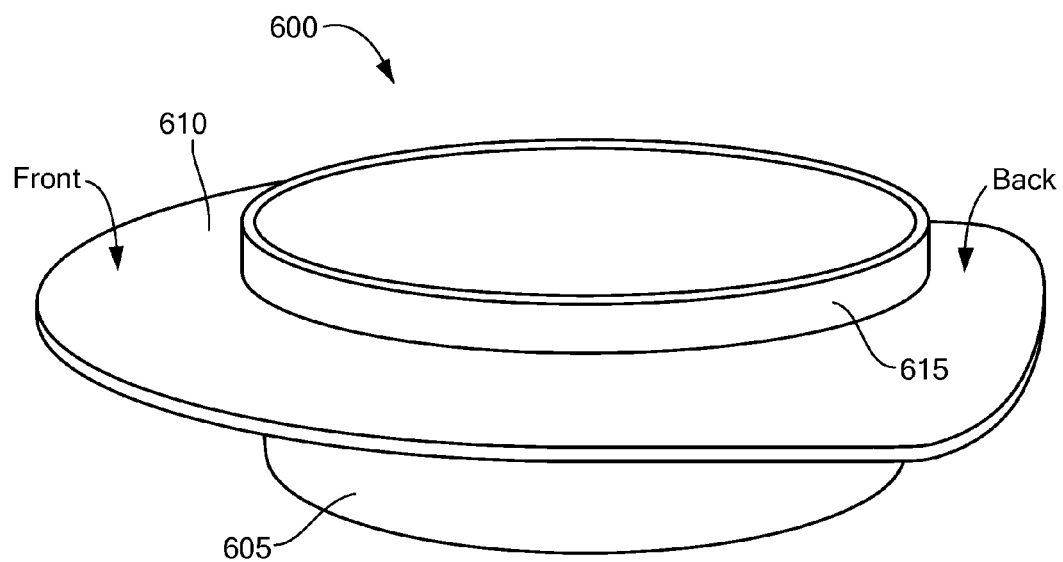
FIG. 6(A) shows a perspective view.
Figure 6B:
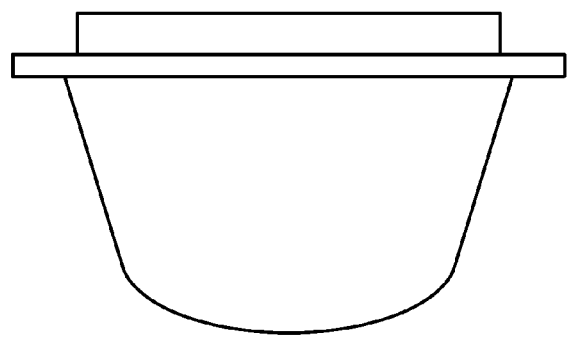
FIG. 6(B) shows a front view.
Figure 6C:
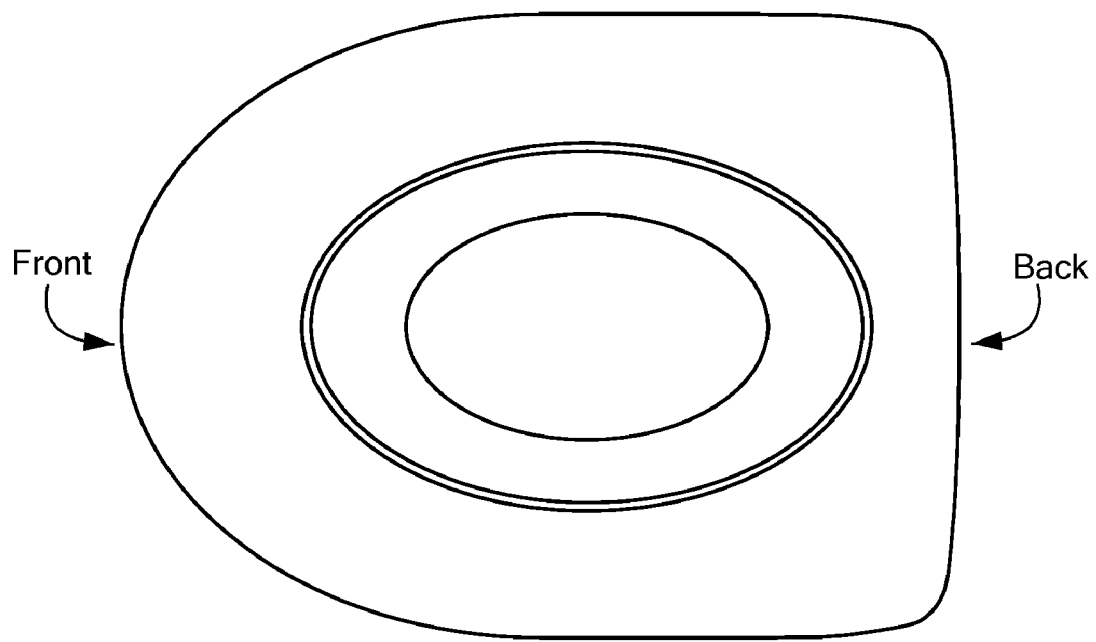
FIG. 6(C) shows a top view.
Figure 6D:
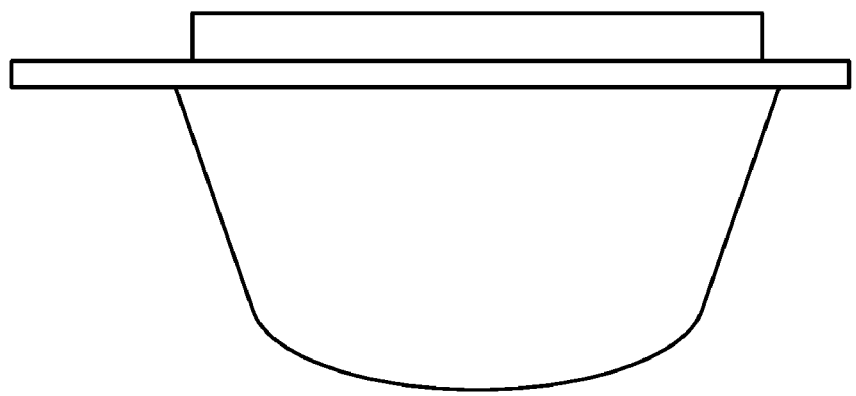
FIG. 6(D) shows a side view.

In another embodiment shown in FIG. 5, the waste-collecting assembly may include a container 500 having a collar or flange 505, extending substantially over the straight supporting base 510 having a sloped side peripheral surface 320. The circumferential flange 505 may have a downward slope 515 extending from the peripheral portion 516 (located around the outskirts of the flange 505) towards the opening 518 of the supporting base 510. The flange 505 generally protects the base from waste spilled outside of and near to the opening 518 and, in addition, guides such waste disposed onto the flange towards the opening 518 along the downward slope 515. As shown, the base 510 additionally has a sloped inner side surface 520 defining the opening 518 through the base 510. As a result, the opening 518 is tapered in the direction of the center of the supporting base 510. The sloped surface 520 is preferably made congruent to a sloped outer (side) surface 525 of the container 500. In various embodiments, the tapered opening 518 and the tapered sloped side surface 525 may be mating, e.g. both surfaces 520 and 525 can be conical surfaces having the same apex angle. Generally, each of the surfaces 520 and 525 extends circumferentially and facilitates a tight fit between the container 500 and the base 510 to assure that penetration of the waste, collected into the container as generally shown by the arrow 530, into the bowl through the opening 518 is minimized. Although in one embodiment a flange 505 may be formatted to be an inseparable part of the container 500, in a related embodiment (not shown), the flange may be releasably attached to the rim of the container's opening, e.g., with the use of thread. In another embodiment, the flange 505 may be fastened to the container 500 in a non-disengageable fashion, known in the art.

Another embodiment of the waste-collecting assembly 600, shown in FIGS. 6(a) through 6(d), includes a reservoir 605 and a flange 610. A lid for closing and sealing the reservoir 605 is not shown. The flange 610 extends outwardly from the body of the reservoir 605 and is wide enough to support the unit on the rim of the toilet bowl under the toilet seat. In operation, such a single waste-collecting unit 600 may be installed onto a rim of the toilet bowl. For example, the assembly 600 may be lowered into the toilet bowl until the appropriately dimensioned flange 610 is firmly rested onto the rim of the bowl and acts as a base supporting the bowl in relation to the rim of the toilet. In a related embodiment, the toilet seat (not shown) which may be hingedly attached to the toilet, may be further lowered onto the flange, which remains sandwiched between the rim and the toilet seat. A collar 615, although shown in FIG. 6, is optional and, if present, is preferably short enough not to protrude above a typical toilet seat when the unit has been installed in the toilet. As a result, the assembly 600, when installed onto the rim of the toilet, preferably does not protrude above the toilet to cause inconvenience to the user of the toilet in operation. A height of the optional collar 615, therefore, may be approximately 1 to 2 inches or less. In related embodiments, the unit 600 may be integral, inseparable into components. For example, the unit 600 can be molded from plastic, whether singly- or multi-layered.

As shown in FIGS. 1 through 6, a body of the reservoir of the waste-collecting assembly may be appropriately shaped to be accommodated by a typical toilet bowl in conjunction with which the assembly may be installed. For example, the body of the container 605 of the unit 600 may be shaped, in different embodiments, to facilitate the unit installation within the bowls of major, most commonly used brands of manufactured toilets produced domestically. In a specific implementation related to the embodiments shown in FIGS. 1 through 6, a container (or reservoir) may be installed into a bowl so as to provide for a clearance (a gap) between a bottom of the container and the nearest lower surface (such as the surface of water) of water in the bowl.

Figure 7:
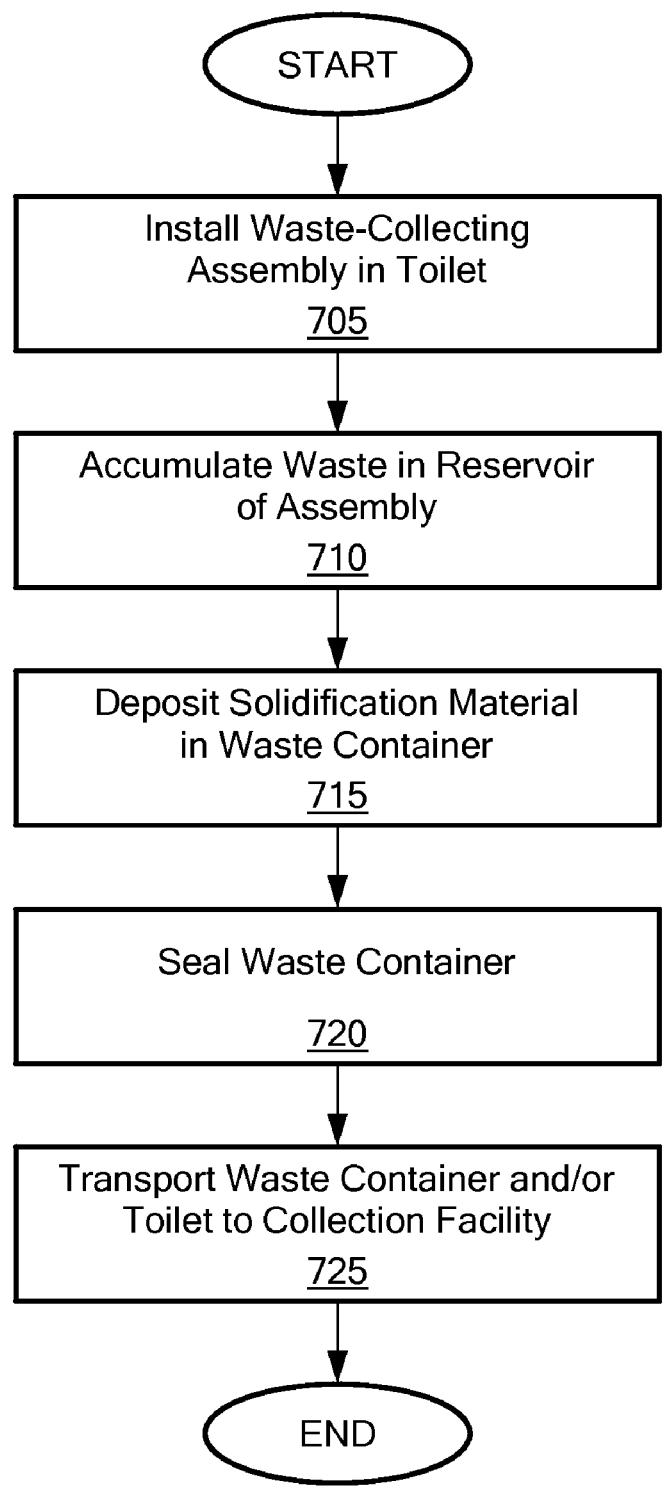
FIG. 7 shows a flow of processing the mutagen human waste, in accordance with an embodiment of the invention.

Processing of human mutagen waste may be generally described as shown in FIG. 7. The process starts at step 705, where an embodiment of a waste-accumulating assembly of the invention is installed in a bowl of a toilet, whether piece by piece or pre-assembled prior to installation. The assembly or an assembly kit, containing the assembly components such as the base, the container, and the lid may be provided, for example, to a hospital or home, where a patient has received treatment with a dangerous agent. The dangerous agent may be, without limitation, a pharmaceutical agent, a mutagen, a carcinogenic, a toxin, a chemotherapy chemical or another hazardous materials or drugs such as materials specified by Occupational Safety and Health Administration (OSHA) or National Institute for Occupational Safety and Health (NIOSH).

The waste reservoir of various embodiments of the invention, such as the container 120 of FIG. 2 or the container 605 of FIG. 6, may have various capacity, e.g. the capacity limited by the toilet within which the container is disposed. In a specific embodiment, the container may be a single-use or multi-use container.

Figure 8C:
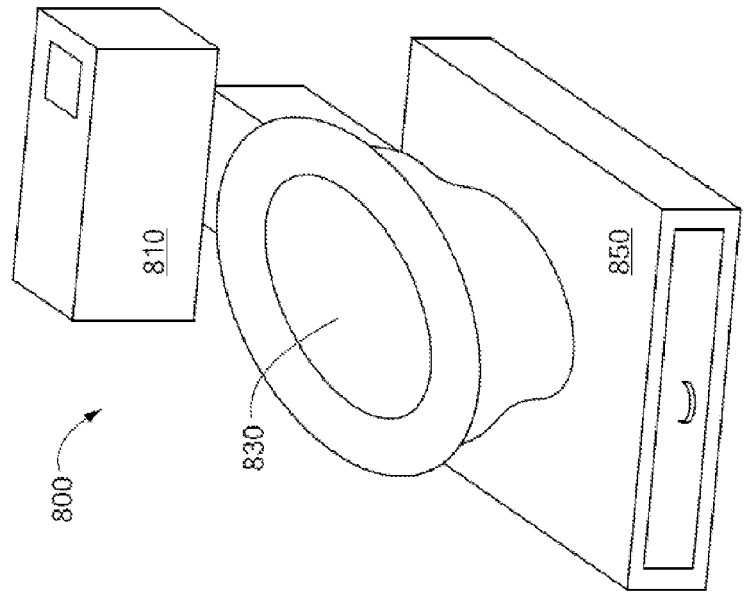
FIG. 8(C) shows a front perspective view of the unit.
Figure 8A:
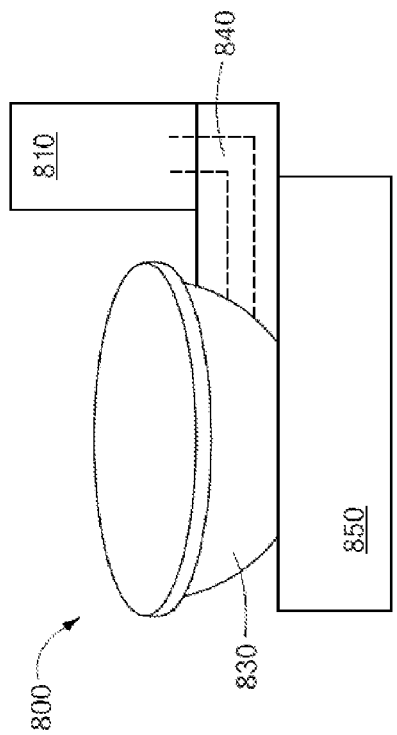
FIG. 8(A) shows a side perspective view of the unit.
Figure 8B:
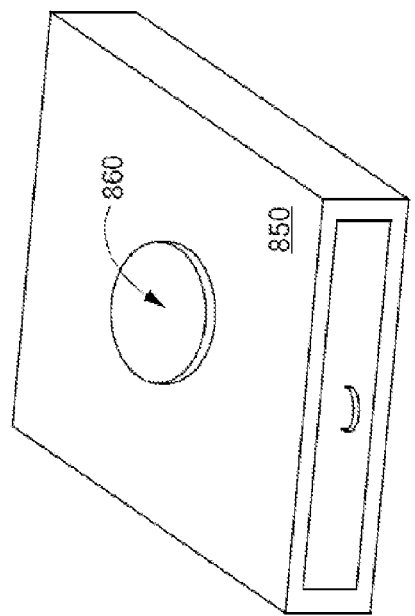
FIG. 8(B) shows a removable draw storage and disposal located at the base of the unit.

The assembly may be used in conjunction with various toilets known in the art including, without limitation, a portable toilet or a urinal. In one implementation, a portable toilet unit is used in conjunction with an embodiment of the invention may be placed in and fixed at a specified location at the hospital, as a leased unit, for example. Such a fixed unit may have a removable waste-collecting chamber sealable upon use, and the appropriate conduits to provide the unit with agents to be mixed with waste and water. An embodiment of such leased unit 800 is shown in FIGS. 8(A-C). More particularly, FIG. 8(A) shows a side perspective view of the unit. FIG. 8(B) shows a removable draw storage and disposal located at the base of the unit. FIG. 8(C) shows a front perspective view of the unit. As shown, the unit includes a container 810 used in conjunction with a reagent pack that can be replaced or refilled. The reagent from the pack is added to the waste disposed into a bowl 830 of the toilet unit through at least one passage 840 shown in dashed lines. Both the waste and the reagent are further delivered from the bowl 830 to a removable draw storage and disposal 850 located at the base of the unit 800 through the opening 860. In addition, the leased unit may have a reservoir (not shown) dedicated to mixing the reagents and the waste.

Figure 9:
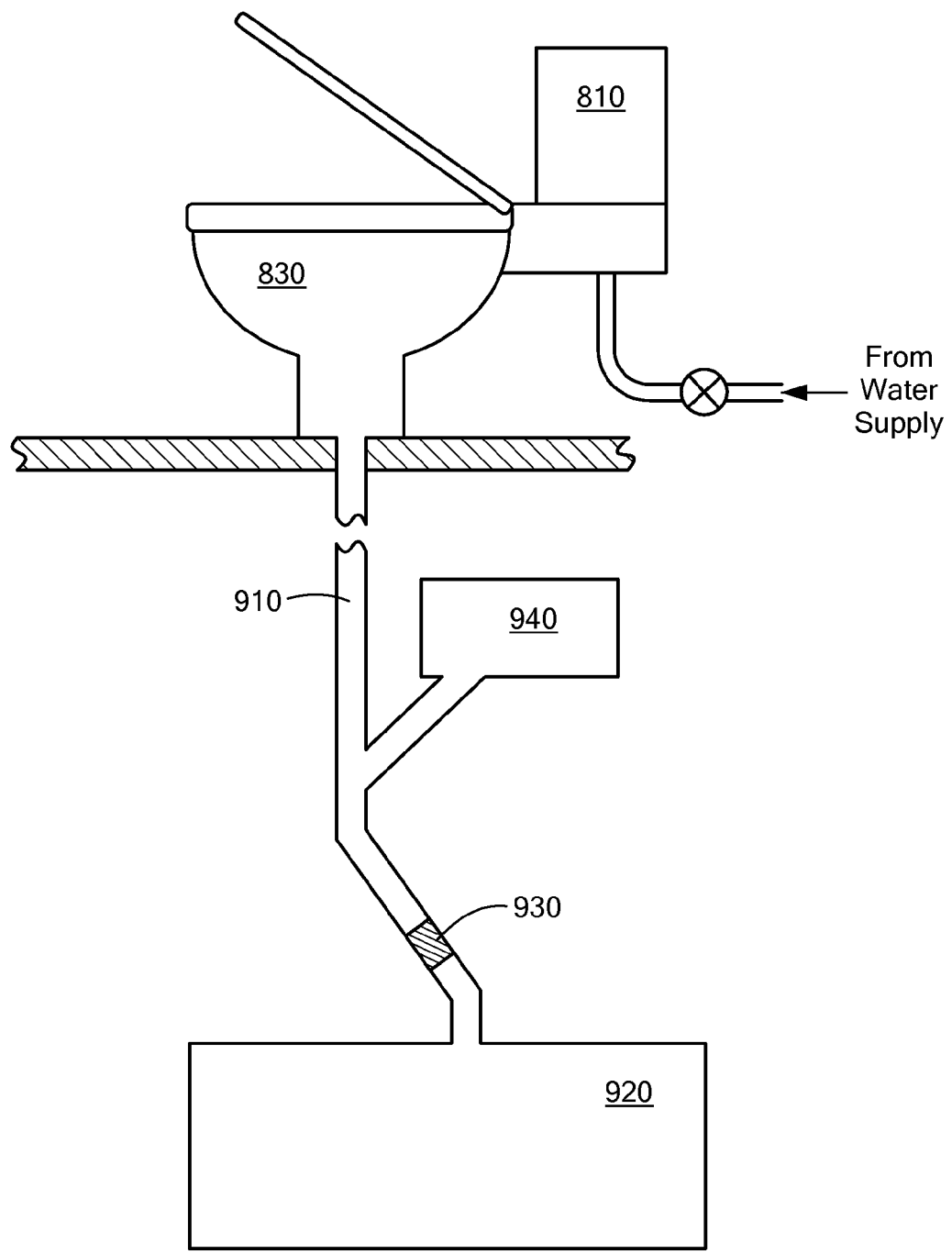
FIG. 9 schematically illustrates an embodiment including a remote waste-collection area.

In another embodiment, shown in FIG. 9, the toilet may be used in conjunction with various plumbing such as pipes or other guides, to allow for release of the mixed material (a mix of waste with reagents) in a collection area that is remote from the toilet, prior to solidification of the mix. This may be beneficial to permanent facilities at hospitals that require a significant amount of waste to be regularly disposed. An example of an remote collection area may be a reusable retaining structure having at least one retaining wall, e.g. a cubic yard box or even a 30 cubic yard rolloff which would be placed outside of a building (e.g., in the ground) and, upon being filled, transported away. In a specific embodiment, the remote collection area may be a storage tank located in basement in the hospital. An embodiment schematically illustrated in FIG. 9 includes a holding tank 810 with reagents and plumbing 910 that guides the carcinogenic waste, reagents, and water from the bowl 830 towards a removable storage tank 920 located in the basement. As shown, the reagent and waste from the toilet pass through a mixing device 930 prior to reaching the storage tank 920. An additional container 940 with reagent and pathogen killing material may be employed.

As mentioned above, the toilet may include a seat for use by a patient. The seat includes a hole through which a patent may secrete waste into the reservoir. The seat may be integral to the toilet, or otherwise adhered to the toilet. In the embodiments of the invention, the assembly may be disposed below the rim of the toilet or, alternatively, on the rim of the toilet so as to have the toilet seat disposed above the assembly. Waste is accumulated in the toilet at step 710. Waste may be, without limitation, mutagen waste.

Upon accumulation of waste in the reservoir, the solidification material is placed on or otherwise mixed with the secreted waste in the container at step 715, causing the waste to solidify. Alternatively, the solidification material may be placed in the container prior to accumulation of the waste, i.e., the reservoir of the assembly installed at step 705 may already contain a solidification material. The solidification material is used to solidify the secreted waste in the reservoir and chemically bind mutagen elements. The solidification material may include, without limitation, cement, clay, kitty litter, vermiculite and/or fly ash. The solidification material may include acidic, alkaline and/or neutral material. The solidification material may be provided in easily managed bags of, without limitation, less than 10 pounds. In various embodiments, the solidification material may be placed in a reservoir included in the toilet that is separate from the reservoir used for the waste. Optionally, the assembly may include a switch or other operator interface, as known in the art, which will permit the solidification material to enter the waste reservoir when desired.

The reservoir containing the solidified waste is then sealed with the lid at step 720. The sealing between the lid and container, accomplished by any of the methods known in the art such as snap-on or interference fitting, may be further reinforced with an appropriate lock and/or adhesive. At least the sealed container and, in some embodiments, the overall assembly, is then transported to a collection facility at step 725. In a preferred embodiment, the entire assembly may be disposable. In an alternative embodiment, the reservoir may be removable, and only the reservoir may be transportable to the collection facility. To initiate transportation of the at least reservoir (or the overall assembly), the patient (or other responsible person to whom the toilet was delivered) may contact an agency responsible for transporting the at least reservoir to the collection facility. The collection facility may be, without limitation, a landfill.

A landfill often requires that any waste delivered be pathogen free. To further this end, a pathogen killing material may be provided. The pathogen killing material may include acidic, alkaline and/or neutral materials. The pathogen killing material may include, without limitation, lime, sodium hydroxide, calcium hydroxide, calcium carbonate, sodium sulfate, and/or sodium carbonate. In various embodiments, the solidification material may kill pathogens (such that an additional pathogen killing material is not needed).

The pathogen killing material may be deposited in the toilet after the waste is accumulated in said portable toilet, prior to solidification. The pathogen killing material may be added to the waste reservoir, without limitation, prior to using the toilet, after every use of the toilet, and/or just prior to transportation to the collection facility. In various embodiments, pathogen killing material may be included in the waste reservoir upon delivery of the toilet to the patient. The pathogen killing material may be added to the reservoir by, without limitation, the patient (or other responsible person to whom the toilet was delivered), or by the toilet delivery and/or transportation agency. A related embodiment of the invention may include an automatic mixing tool for mixing the agent such as solidifying agent or a pathogen killing material, stored in an auxiliary agent container, with the waste and appropriate means for providing electricity and water for completing the process of neutralization of waste.

An exemplary waste collecting system that may be used by a patient in a home-care situation may include a set of a predetermined number (e.g., twenty-four) of containers such as containers discussed in reference to FIGS. 1 through 6, for single use. The system would also include corresponding twenty-four packages filled with pre-measure amount of reagent as well as a urine-only collection bottle. The system may be delivered to the patient's home using postal services, for example. Having collected the mutagen waste in a container, the patient will mix the reagents as appropriate, add any additional urine from the urine-only collection bottle, seal the container and place it in a provided box. The box may have special lining to contain any overflow. Once all the containers are used up and the box is filled, the waste collection system is sealed and mailed to the collection facility. Alternatively, a pick-up service may be arranged, depending on the nature of the mutagen and possible exposure of other people to it.

An example of processes of solidification and chemical deactivation of the mutagen waste according to one embodiment of the invention is disclosed below. When a solidification material, added to the reservoir of the assembly contains cement, for example, setting and hardening of a cement component is caused by the formation of water-containing compounds (such as urine), forming as a result of reactions between cement components and water. As a result of the reactions (which start immediately upon mixing the solidification material with the waste), a stiffening can be observed which is very small in the beginning, but which increases with time. The hydration products primarily affecting the strength of the solidified waste are calcium silicate hydrates, calcium hydroxide, sulfatic hydrates and related compounds. The simplified reaction may be expressed as:

$$2Ca_3OSiO_4 + 6H_2O(drugs) \rightarrow 3CaO.2SiO_2.3H_2O(drugs) + 3Ca(OH)_2,$$

wherein "drugs" indicate carcinogenic component of water-containing mutagen human waste. Another possible chemical reaction may be expressed as $$2Ca_2SiO_4 + 4H_2O(drugs) \rightarrow 3CaO.2SiO_2.3H_2O(drugs) + Ca(OH)_2.$$

In the process of solidification of the mix, the alkalinity of the environment for carcinogenic contents, trapped within the pores of the cement-based solidified microstructure (i.e., its pH-value), increases. The increasing alkalinity of the waste-mix neutralizes and kills the bacteria contained in the waste.

The embodiments of the invention described above are intended to be merely exemplary; numerous variations and modifications will be apparent to those skilled in the art. All such variations and modifications are intended to be within the scope of the present invention.

What is claimed is:

1. A method for processing human waste that includes a chemotherapy chemical, the method comprising:
   placing a support, having a side surface congruent to an inner surface of a bowl of a toilet, below a rim of the toilet, such that the side surface of the support is in contact with the inner surface of the bowl;
   affixing a rigid waste container to an opening of the support to form a waste-collecting assembly;
   accumulating human waste that includes the chemotherapy chemical in the container;
   depositing a solidification material in the container to solidify the waste, the solidification material chemically binding with the chemotherapy chemical; and
   sealing the accumulated waste within the container.

2. A method according to claim 1, wherein placing the support in relation to the rim of the toilet includes placing the support on the rim of the toilet.

3. A method according to claim 1, further comprising transporting at least the container with sealed solidified waste to a collection facility.

4. A method according to claim 1, further comprising depositing a pathogen killing material in the container.

5. A method according to claim 4, wherein the pathogen killing material includes at least one of an acidic material, an alkaline material, a neutral material, lime, calcium hydroxide, calcium carbonate, sodium sulfate, and sodium carbonate.

6. The method according to claim 1, further comprising depositing sodium hydroxide in said container prior to or after the waste is accumulated in said container.

7. The method according to claim 6, further comprising depositing a neutral material in said container prior to or after the waste is accumulated in said container.

* * * * *